United States Patent [19]
Carlin et al.

[11] Patent Number: 5,888,589
[45] Date of Patent: Mar. 30, 1999

[54] PROCEDURE FOR THE ANTI-SCALER PRODUCTION FOR COATING THE POLYMERIZING REACTOR AND RESPECTIVE RESULTANT PRODUCT

[75] Inventors: Francesco Carlin; Mario Sattin, both of Rovigo, Italy

[73] Assignee: C.I.R.S. S.p.A., Rovigo, Italy

[21] Appl. No.: 952,087

[22] PCT Filed: May 7, 1996

[86] PCT No.: PCT/IT96/00092

§ 371 Date: Jan. 22, 1998

§ 102(e) Date: Jan. 22, 1998

[87] PCT Pub. No.: WO96/35723

PCT Pub. Date: Nov. 14, 1996

[30] Foreign Application Priority Data

May 12, 1995 [IT] Italy .................................. UD95A0085

[51] Int. Cl.$^6$ ................................ B05D 3/00; C08F 2/00
[52] U.S. Cl. .......................... 427/444; 524/541; 526/62
[58] Field of Search .............................. 427/385.5, 444; 524/541; 526/62

[56] References Cited

U.S. PATENT DOCUMENTS 3,669,946  6/1972  Koyanagi et al. .
3,825,434  7/1974  Berens et al. .
4,068,059  1/1978  Witenhafer .

FOREIGN PATENT DOCUMENTS

| 0 052 421 A1 | 5/1982 | European Pat. Off. . |
| 0052421 | 5/1982 | European Pat. Off. . |
| 0 598 537 A1 | 5/1994 | European Pat. Off. . |
| 0598537 | 5/1994 | European Pat. Off. . |
| A-5-230112 | 9/1993 | Japan . |

OTHER PUBLICATIONS

Database "Chemical Abstracts" Abs 120; 108 067, Columbus, Ohio & JP,A, 05 230 112 (Shinetsu Chem. Ind. Co., Sep. 1993.

Primary Examiner—Michael Lusignan
Attorney, Agent, or Firm—Finnegan, Henderson, Farabow, Garrett & Dunner, L.L.P.

[57] ABSTRACT

This invention relates to a process for producing an anti-scaler product for coating polymerization reactors comprising condensing a naphthol with an aldehydic cross-linking agent, wherein the cross-linking agent is the reaction product of an aldehyde and a hydrosulphite.

12 Claims, No Drawings

PROCEDURE FOR THE ANTI-SCALER PRODUCTION FOR COATING THE POLYMERIZING REACTOR AND RESPECTIVE RESULTANT PRODUCT

TECHNICAL FIELD

My invention relates to a procedure for the anti-scaler production for coating the polymerizing reactors and respective product.

Anti-scaling agents for polymerizing reactors are already well known in prior art.

BACKGROUND ART

At the present state of the art there are also different types of anti-scalers for each type of polymer.

For example the anti-scaler for the production of vinyl chloride is not the same as that used in the reactor for the production of polystyrene or of that for the production of acrylic polymers, and so on.

This fact necessitates in the storing of different products with all the consequences of high management costs.

Additionally even the reactors must be specifically dedicated to only one reaction type, resulting in the increase of costs.

DISCLOSURE OF INVENTION

A first aim of this invention is that to make an anti-scaler that operates well in any type of polymerizing reactor and for the most varied types of different materials, therefore for vinyl chloride, as well as for styrene and acrylic polymers, etc.

In the specific case of vinyl chloride for example, it is known that in the reactors a substantial deposit of scale forms having as main drawbacks:

- a consistent maintenance for the removing of the scaling with consequent interruption of the production, opening of the reactor and therefore high quantities of gaseous vinyl monomer chloride (VCM) immissions into the atmosphere;
- pollution of the resultant product as some of the scaling parts go into the respective polymerized product with consequent worsening in quality and complaints of the users;
- in definitive obstacles both in the productive system and in ecological problems for the areas in which the industrial polyvinylchloride plants (P.V.C.) operates.

This problem practically exists for all types of polymerizations.

Furthermore the anti-scaling products destined to coat the surfaces of the respective reactors are of a bluish colour or dark brown nearly black, wherefore the particles that detach from the crust, pollute the obtained polymer (for example obtained polyvinyl chloride) from the reactor under the form of black dots, that for example in the finished products worsens the qualitative aspect of the same product.

Furthermore it is to be noted that the material particles that detach from the crust of the wall, end up in the product in reaction, constituting the pollution of the same, dealing generally with toxic products.

In prior art, the technique of condensation or from polycondensation of naphthols with a aldehydic cross-linking product (eg., formaldehyde and others), to obtain antiscaling products is known.

For this purpose one refers to:

U.S. Pat. No. 3,669,946 (filed in the U.S. on Aug. 31st, 1970, disclosed on Jun. 13th, 1972), that suggests the use of formaldehyde and ketonic composites, naphthol etc. and also alpha-naphthylamine and nigrosin. This teaching predivulges the general concept of forming condensate antiscalers parting from the formaldehyde and naphthols combination.

U.S. Pat. No. 3,825,434 (23rd Jul. 1974) describes an anti-scaling agent for the polymerizing of vinyl chloride, obtained from the condensation of the phenol with formaldehyde, where obviously for definition in this patent the obtained product is always classified as pertinent to the phenol-formaldehyde or poliarilphenol family.

U.S. Pat. No. 4,068,059 (filed on 17 Feb., 1977; published on the 10 Jan. 1978) explains furthermore the importance of using as anti-scalers, products that in their chemicals structure contain one or more of the following groups: —OH; —COOH; SO3H and SO3Na.

These groups are usually attached to an aromatic nucleus.

EP-A-0052421 describes a process for obtaining an anti-scaling product that differs for the fact that the formaldehyde is made to react with 1-naphthol (alpha-naphthol), in which both the nuclear positions 2 and 4 are not replaced and the nuclear position 3 is not replaced or has a substitute that is not strongly electron-attractor to obtain a condensate.

It is also opportune to note that the use of the naphthols is already suggested from the U.S. Pat. No. 3,669,946, therefore it was obvious to use 1-naphthol in the preceding process in place of the phenols as mentioned.

Even in this case the product obtained according to the chemistry is to be considered always as pertinent to the poliarilphenol family.

These last products have the drawback to supply, in contact with oxygen, a dark brown or dark blue nearly black product, and not always being suitable for usages in sectors of polymerizing with different materials.

Sometimes the reaction is difficult to control and leads to reticulate products insoluble in alkaline aqueous solution.

Furthermore, the coating of the reactor with these anti-scalers is consumed easily dispersing itself in the material in reaction, polluting it by colour and by toxicity.

Furthermore we must point out that these anti-scalers are of poor efficacy, or however require a massive deposit of scale on the wall, such to preclude some usages, as for example, sanitary and alimentary, where the requested limits of polluting products in the finished product are decidedly lower etc.

To obtain a good anti-scale efficacy, they must however deposit on the wall in high quantities which also affects costs.

The colour of the anti-scalers of the known technique is dark and little appreciated by the user also because it makes one think of a pollutant product.

The dark colour of the product leads to a crust on the wall, also of dark colour (blackish) and this does not allow to see eventual application defects. But much more serious is that already mentioned, that during the reaction crust particles detach and mix with the polymer. As these crust parts are black it is clear that there is a qualitative worsening of the product.

Aim of the present invention is that to obviate the abovementioned drawbacks and in particular to obviate the dark colour of the product and of the crust that it will form on the wall of the reactor.

The inventors originally thought of making an antiscaling product that once applied onto the wall of the reactor is substantially colourless.

It is known that for whitening an aromatic product, for example colourants, hydrosulphite sodium or hydrosulphite potassium is used.

The inventors had the idea to translate this banal bleaching principle in the making of the anti-scalers to obtain the colourless product desired.

Attempts to utilize hydrosulphite in conjunction with formaldehyde and 1-naphthol have given negative results because the condensate result always remained bluish black tending to form deposits even if conducted in absence of oxygen, example presence of nitrogen.

In proceeding the research it was thought to avoid the reaction between formaldehyde and 1-naphthol in order to avoid the use of the formaldehyde as such and use a aldehydic product that allows however to obtain an uncoloured condensate product.

After innumerable experimentations it is found that the best product to combine with 1-naphthol is rhongalite.

The result was surprising and the condensate product obtained was perfectly colourless.

In the anti-scaling tests in the reactors of polyvinyl chloride astounding results were obtained both for performance, quality and yield, being-able to be used also by production of other polymers.

The rhongalite is the trade name of a common product that chemically is defined as formaldehyde-sulfoxilate of sodium, with formula:

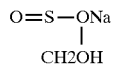

This product is obtained by reacting between hydrosulphite and formaldehyde and the result therefore is not more a formaldehyde.

Therefore for this reason the condensate product was no longer dark-bluish or even black, and that obviously because the primary reaction of the 1-naphthol with the formaldehyde was inhibited, contrary to the teachings for the anti-scaler production of the prior art.

In conclusion it was discovered that an aldehydic cross-linking agent must be used characterized by the fact that it was obtained by means of the aldehyde and hydrosulphite reaction.

The preferred solution is obtained by using this sulfoxilate in a mixture with 1-naphthol in the weight proportions of 1 to 1.5, in aqueous solution from 10 to 40%, and carrying the solution at a temperature between 70° and 95° C. in a nitrogen atmosphere, alkaline environment (pH 11–13), therefore a condensate product of a clear transparent colour is obtained, reaching fully the prefixed purpose and without decreasing the quality of the product, infact improving it.

The product condensed in this way results physically of a clear aspect, transparent, but if it is left for a certain period in the presence of air it oxidizes slightly verging towards a greeny bluish colour.

The surprise however derives in that, if the contact with oxygen is interrupted, the product reverts to its original transparent clear aspect.

This physic behaviour proves that one has reached a completely new and structurally different product if compared to the products of prior art, where this physic phenomenon could be observed.

From the chemical and spectroscopic analysis various hypothesis have been advanced on the structural nature of the product, and even not being entirely certain of the structure, one believes that the reversibility of the phenomenon could be tied to the presence in the condensate of a reducing activity, probably due to the presence of a reducing radical.

In definitive according to the more probable deductions it should deal with an abducted bisulphitic of the first product of the reaction that forms between 1-naphthol and rhongalite.

The product applied onto the surface of the reactor in an atmosphere deprived of oxygen, after drying, results an opalescent white opaque colour, contrarily to the dark colour of the present antiscalers.

The results have been therefore surprisingly good.

To maintain the transparent aspect of the liquid product before the application onto the wall, according to the present invention it is conserved in containers impermeable to oxygen.

Advantageously it was discovered that the best conservation is by means of pressurization of the container with neuter gas, preferably nitrogen.

Just as advantageous it was discovered that the most effective containers are of glass or better still of polyethyleneterphtalar "PET" (in such a way the containers do not pollute and are fully recyclable).

With the use of the container in "PET" (flexible container), an another important physic behaviour was discovered:

when a liter bottle, for example, of the product is opened according to the present invention closed down tightly and that, given the transparency it is visible transparent, leaving the bottle open for a few minutes to the air, the contained product becomes dark;

closing the bottle again after the product has become dark, it is noted that the bottle in flexible "PET", withdraws slightly. This could be justified in that the product destroys all the oxygen which has remained in the air which is contained in the bottle previously open and now closed.

Afterwhich the product returns to a clear transparent colour as before, as if nothing had happened.

This proves that the product auto-protects itself or it autoreconstitutes in its original aspect, with the condition however that it is kept away from air contact.

The product conserved as such remains therefore unaltered, of clear colour, and in the experimentation of application onto the wall of the reactor (obviously in the presence of inert gas), the anti-scaler is deposited onto the wall as a thin stratum becoming as mentioned above, colourless and transparent.

Advantageously it was discovered that the application onto the wall of the reactor must be made not only in absence of oxygen but also by means of a water vapour spray at high temperature.

Spraying the product with water vapour at high temperature (the highest possible) we obtain the maximum adherency result.

As the reaction of polymerizing in reactor lasts on average from four to six hours it is evident that in this time and in absence of oxygen, there are no substantial degradations of the product, and consequently calorimeter degradations, therefore once the reaction of polymerizing is completed and once the smallest anti-scaling percent is integrated in the polymerized mass, this will not undergo further important contaminations and degradations.

Instead, in prior art using the anti-scaling products previously known, one had to fully wash and empty the reactor from any minimum trace of the residue of the product applied onto the wall as an anti-scaler, with this new product, it is possible to send the rinse of the reactor to the tank collection of the aqueous suspensions of the polymer obtained without requiring further refuse discharges, realizing in this way a complete and effective and above all economic technology of the loading and unloading of reactors of polymerizing of monomer vinyl chloride with the technique named by the experts of the sector as man hole closed.

As the rhongalite may be also prepared with a molar hydrosulphite excess, even using this product a condensate of analogous or improved performance (largely reducing condensate) is obtained.

As both in this case and that of the preceding, the activity of the product is always given from the presence of bisulphate derivatives and in particular of radical bisulphites present in the condensate, this characteristic clearly distinguishes the new product from the prior art, and in particular with reference to the resulting structure of the condensed product, this identifies as innovator for the presence of an interposed carbon atom between the aromatic ring and the sulphonic salified group.

It is also proved that in place of the 1-naphthol other naphthols can be used with more or less similar results.

Obviously for the cited aim rather than making the formaldehyde react with the sodium hydrosulphite to obtain the rhongalite, the formaldehyde could be made to react with potassium hydrosulphite obtaining a product equally effective to be used for the formation of condensate.

It is important however that the hydrosulphite prevents the evolution of the reaction towards stable condensed forms.

We claim:

1. A process for producing an anti-scaler product for coating polymerization reactors comprising condensing a naphthol with an aldehydic cross-linking agent, wherein the cross-linking agent is the reaction product of an aldehyde and a hydrosulphite.

2. A process for producing an anti-scaler product for coating polymerizing reactors according to claim 1, wherein the hydrosulphite is sodium hydrosulphite.

3. A process for producing an anti-scaler product for coating polymerizing reactors according to claim 1, wherein the hydrosulphite is potassium hydrosulphite.

4. A process for producing an anti-scaler product for coating polymerizing reactors according to claim 1, wherein the hydrosulphite is present in an amount effective to prevent the evolution of stable condensate forms.

5. A process for producing an anti-scaler product for coating polymerizing reactors according to claim 1, wherein the aldehyde and the hydrosulphite are reacted in a basic environment.

6. A process for producing an anti-scaler product for coating polymerizing reactors according to claim 5, wherein the basic environment has a pH of 11–13.

7. A process for producing an anti-scaler product for coating polymerizing reactors according to claim 1, including condensing a sulfoxilate cross-linking agent with 1-naphthol in weight proportion of 1 to 1.5, respectively, in a 10–40% aqueous solution and maintaining the solution at a temperature of between 70° and 95° C. in a nitrogen atmosphere, and in an alkaline environment, to obtain a clear transparent condensate product.

8. A process for producing an anti-scaler product for coating polymerizing reactors according to claim 1, wherein the anti-scaler product is stored in a container impermeable to oxygen.

9. A process for producing an anti-scaler product for coating polymerizing reactors according to claim 8, wherein the anti-scaler product is stored under pressure in an inert gas.

10. A process for producing an anti-scaler for coating polymerizing reactors according to claim 9, wherein the anti-scaler is stored in a polyethyleneterephthalate (PET) container under pressure in nitrogen.

11. A process for producing an anti-scaler product for coating polymerizing reactors according to claim 10, wherein the container is transparent.

12. An anti-scaler product prepared by the process of claim 1, wherein the anti-scaler product contains an amount of hydrosulphite or bisulphite radicals whereby in the absence of oxygen, the product has a clear transparent colour, and in the presence of oxygen, the product becomes of green-bluish colour or opaque, and when the contact with oxygen is interrupted, the agent reverts to the clear transparent colour.

* * * * *

UNITED STATES PATENT AND TRADEMARK OFFICE
CERTIFICATE OF CORRECTION

PATENT NO. : 5,888,589
DATED : March 30, 1999
INVENTOR(S) : Francesco CARLIN and Mario SATTIN It is certified that error appears in the above-identified patent and that said Letters Patent is hereby corrected as shown below:

In Claim 12, col. 6, line 37, "colour" should read --color--.
In Claim 12, col. 6, line 38, "colour" should read --color--.
In Claim 12, col. 6, line 40, "colour" should read --color--.

Signed and Sealed this

Twenty-seventh Day of July, 1999

Attest:

Q. TODD DICKINSON

*Attesting Officer*   *Acting Commissioner of Patents and Trademarks*